United States Patent [19]
Daecher

[11] Patent Number: 5,916,648
[45] Date of Patent: Jun. 29, 1999

[54] FLEXIBLE SHEATHING AND CLADDING

[75] Inventor: Jeffrey Lawrence Daecher, Sicklerville, N.J.

[73] Assignee: Rohm and Haas Company, Philadelphia, Pa.

[21] Appl. No.: 08/812,420

[22] Filed: Mar. 6, 1997

[51] Int. Cl.⁶ ........................................ G02B 1/04

[52] U.S. Cl. .................. 428/36.9; 428/36.91; 428/36.92; 428/421; 428/422; 385/141; 385/143; 385/144

[58] Field of Search ...................................... 385/123, 141, 385/143, 144; 428/421, 422, 36.9, 36.91, 36.92; 362/32

[56] References Cited

U.S. PATENT DOCUMENTS

| | | | |
|---|---|---|---|
| Re. 34,901 | 4/1995 | Herbrechtsmeier et al. | 385/143 |
| 5,406,641 | 4/1995 | Bigley, Jr. et al. | 385/141 |
| 5,485,541 | 1/1996 | Bigley, Jr. et al. | 385/141 |
| 5,734,773 | 3/1998 | Teshima et al. | 385/126 |

*Primary Examiner*—Charles Nold
*Attorney, Agent, or Firm*—Guy T. Donatiello

[57] ABSTRACT

A flexible light pipe consisting of a light-transmitting core, a cladding, and a sheathing is described which, by suitable choice of cladding and sheathing materials, exhibits a combination of good flexibility for bending and shaping whilst retaining good resistance to kinking or other interruptions which can adversely affect transmission of light.

7 Claims, No Drawings

FLEXIBLE SHEATHING AND CLADDING

BACKGROUND OF INVENTION

This invention relates to an improved composition for cladding and sheathing a flexible potentially light-conducting core to form a flexible light pipe ("FLP"), and the improved FLP composition which results. The invention also relates to a FLP having a core diameter of a least 3 millimeters, useful for conveying visible light and which remains highly flexible and transparent under a wide range of use conditions, yet is resistant to kinking and to deformation which would alter cross-sectional dimensions of the FLP and adversely affect the transmission of the supplied light.

Most plastic light pipes or light guides known to the art are based on single or bundled fibers of optically clear rigid polymers like poly(methyl methacrylate), although a few composites are known based on cores of flexible, optically clear polymers of lower glass temperature, such as poly (alkyl acrylates). Several patents exist to very soft light pipe, which is so low in modulus as to be deformable under use conditions where it is not protected in a solid enclosure.

U.S. Pat. Nos. 5,406,641 and 5,485,541, both herein incorporated by reference, teach a process for preparing such a flexible light pipe, preferably from a crosslinked poly (alkyl acrylate) core, which core is enclosed in a polymeric cladding and further protected by a polymeric sheathing. These applications teach a variety of cladding materials with refractive indices lower than the polyacrylate core, preferring fluorinated polymers and exemplifying terpolymers of perfluoroalkyl vinyl ether/tetrafluoroethylene/hexafluoropropylene (FEP) and of vinylidene fluoride/tetrafluoroethylene/hexafluoropropylene (THV). These cited applications further teach a number of polymers useful as sheathing, such as polyethylene, linear low density polyethylene, polypropylene, and polystyrene.

As the development of FLP has continued, certain specific uses, such as supplying illumination through a tortuous path with many bends or curves, or where the FLP must conform to the motion of a flexible support frame or body, have been identified, which uses require a combination of flexibility and resistance to deformation beyond those taught or suggested by the existing art. In particular, there has been identified a need for combination of cladding and sheathing which will give the highest combination of flexibility and deformation resistance, two properties difficult to find in a cladding/sheathing combination, to the clad and sheathed light pipe whilst maintaining resistance to kinking and further protecting the surfaces of the core, and still retaining the optical properties of the core/cladding system i.e., conduction of light through the desired distance without excessive loss. Improved flexibility alone, such as may be exhibited by a low modulus FLP in a low modulus cladding/sheathing combination, is not sufficient for achievement of resistance to kinking or resistance to deformation under low load, also necessary for the envisioned uses for this special grade of FLP.

I have found a combination of cladding and sheathing which is effective for this purpose and superior to those taught in the prior art. Specifically, I have discovered a flexible light pipe having a visible light transmission loss of less than 2 decibels/meter, comprising;

a) a crosslinked core polymer of diameter at least 3 mm;
b) a fluoropolymer cladding whose refractive index is lower than that of the core;
c) a sheathing for the core/cladding combination which in combination with the core and cladding will (a) withstand (as measured by the $D_f$ value described below) a 180 degree bend at 20° C. at a bend radius equal to or less 2 times the core mixture diameter; (b) exhibit a drape test arc width (as measured by the DW value described below) less than 15 times the diameter of the drape rod.

A preferred embodiment is wherein the fluoropolymer cladding is vinylidene fluoride/tetrafluoroethylene/hexafluoropropylene terpolymer; an especially preferred embodiment is wherein the terpolymer cladding contains 50–55 weight percent vinylidene fluoride, 28–32 weight percent tetrafluoroethylene and 16–20 weight percent hexafluoropropylene.

Another preferred embodiment is wherein the sheathing contains a thermoplastic elastomer, more preferably a styrene/hydrogenated butadiene block copolymer or a styrene/hydrogenated butadiene/styrene block copolymer. Another preferred embodiment is wherein the sheathing further contains a polyolefin, more preferably linear low density polyethylene. An especially preferred embodiment is wherein the sheathing is a blend of a styrene/hydrogenated butadiene block copolymer and linear low density polyethylene in the weight ratio 1:1 to 6:1; an even more especially preferred ratio is 1:1 to 4.1.

The flexible light pipe itself must be capable of being bent and shaped, often repeatedly, without fracture or distortion, as well as retaining its ability to be conductive of light. Several chemical approaches to formation of the light-conducting core, such as polymerization of acrylate esters, of certain silicone polymers, certain polyesters, and the like, may be employed. The method to crosslink may be varied, such as the use of functionalized monomers, or of ionizing radiation, and the like. The FLPs of the invention have useful optical properties and a visible light transmission loss of less than about 2 decibels ("dB") per meter (i.e. 2000 dB per kilometer), preferably less than about 1.0 dB/m (ca. 93% transmittance per foot), more preferably less than about 0.70 dB/m, even more preferably less than about 0.65 dB/m, and most preferably less than or about 0.50 dB/m.

However, to obtain a cured composite which is a FLP having core diameter >3 mm and having flexibility at or below ambient temperatures, the copolymer core should have a $T_g$ (glass temperature) equal to or less than about 0° C., preferably less than about minus 10° C.

"Flexibility" of a light pipe or FLP is defined at a given use temperature. For the FLP of the Bigley et al. invention, flexibility at room temperature (about 20° C.) meant the ability of the FLP to withstand a 180 degree bend without cured core mixture fracture at a bend radius equal to or less than five times ("5d") the core mixture diameter ("1d") of the FLP. Such a fracture results in light transmission loss, rendering the FLP ineffective. The radius can be determined, for example, by use of a mandrel. However, there are many uses, such as those taught below, for which the degree of flexibility taught by Bigley et al. alone is insufficient. The Bigley test may define adequate resistance to kinking, but it does not relate to the ability of the FLP to take a contoured shape and to maintain that shape.

To define the attributes of the improved FLP, a drape test or the like is required, which relates to the ability of the FLP to drape over a surface without too high a stiffness, which leads to imperfect shaping for the desired use. The drape test measures the ability of the FLP to hang over a specified mandrel with the ends of the FLP being as close together as allowed by the flexibility of the core and cladding components. High distances, relative to the mandrel size, indicate the FLP is too stiff for the specific purposes of a highly flexible, yet kink-resistant, light pipe.

"Softness" of the FLP core (cured crosslinkable core mixture) is described in Bigley et al. as a desirable property because it is related to breakage and fabrication techniques. Softness is defined herein by a "level of compressibility" discernible by a modified Shore "A" test described below. A degree of softness, typically a Shore "A" value <90, is desired to enable cutting of a FLP by a hand held instrument, such as a scissors or knife, in the field (i.e. not requiring motorized instruments or factory equipment) and to facilitate the flush fit against other light conduit such as a glass pipe, glass rod, connector, light pipe or an FLP. However, a Shore hardness <90 does not fully define the parameters required to the improved FLP described herein.

Especially preferred compositions and processes for preparing flexible light pipe are disclosed in the Bigley et al. patent and allowed patent, incorporated by reference. Specifically, there is provided a composition for a light pipe crosslinkable core mixture which comprises:

a) from about 95 to about 99.9 weight percent, based on the crosslinkable core mixture weight, of an uncrosslinked copolymer having weight average molecular weight from about 2,000 to about 250,000 daltons, the uncrosslinked copolymer comprising:
  i) from about 80 to about 99.9 weight percent, based on the uncrosslinked copolymer weight, of a bulk monomer selected from methyl acrylate, ethyl acrylate, normal butyl acrylate, or mixtures thereof,
  ii) from about 0.1 to about 20 weight percent, based on the uncrosslinked polymer weight, of a functionally reactive monomer selected from 3-methacryloxypropyltrimethoxysilane or vinyltrimethoxysilane; and
b) from about 0.1 to about 5 weight percent, based on the crosslinkable core mixture weight, of a reactive additive comprising water and a dialkyltin dicarboxylate.

Particularly preferred is the composition wherein:

a) the bulk monomer is ethyl acrylate;
b) the reactive monomer is 3-methacryloxypropyltrimethoxysilane; and
c) the dialkyltin dicarboxylate is dibutyltin diacetate.

Most preferred is the uncrosslinked copolymer derived from about 94 to about 98 weight percent ethyl acrylate and from about 2 to about 6 weight percent MATS.

To obtain the optics for useful light pipe, a cladding is required with a refractive index lower than that of the core. Further, the cladding needs to be able to contain the core polymer effectively. Depending on the manufacturing process, the cladding may contain the monomers which are polymerized to form the core, the core polymer only partially polymerized, the core polymer polymerized but not crosslinked, and/or the fully crosslinked core polymer. Many cladding materials are known for this purpose, especially fluoropolymers which are of lower refractive index than most of the core polymers known to the art.

For the present purposes, the cladding need also be flexible, to avoid kinking, tearing, stretching or any defect which will alter the light-carrying characteristics of the clad/core light pipe. This property can be approximated by physical properties of the cladding alone, but measurement of the flexibility of the core and cladding in combination is the best judgment of utility. Especially useful for this purpose are non-crystalline terpolymers of vinylidene fluoride/tetrafluoroethylene/hexafluoropropylene, more especially in the compositional range of 50–55 weight percent vinylidene fluoride, 28–32 weight percent tetrafluoroethylene and 16–20 weight percent hexafluoropropylene.

The ability to resist deformation leading to loss of optical transmission is tested at 21±1° C., using an instrument designed for smoothly varying the bend radius and providing a failure criterion of core material fracture. The test apparatus comprises an 8" (20.3 cm.) diameter, six-jaw lathe chuck situated horizontally on a flat surface. Four jaws, positioned to define a 180° bend, are used to approximate an "adjustable diameter mandrel." Each jaw has two azimuthal slots cut in different radial positions to hold a light pipe, which pipe is sheathed. The bend diameter range which can be investigated by the device is from about 2.5 to 20 cm., measurement being made from center to center of the pipe at the 180° bend. Samples are 100 cm. in length. The sample is then placed into appropriate slots in the fixture, which had been preset to the desired test radius. To maintain sample geometry (and the relevance of the measured intensities), the entire test is conducted without unhooking either the light source or the detector from the sample ends. A mold release agent, such as "Mold-Wiz M-57" or other non-destructive lubricant, is sprayed onto those portions of the chuck assembly which contact the FLP samples between measurements of different samples, so that there will not be a problem with adhesion of the FLP to the jaws, which would distort the results.

The first measurement of transmitted light intensity is made at a 20 cm. diameter bend, and at each successive decrease of one centimeter in diameter. When a value of 12 cm. is reached, the design of the particular holder utilized required moving the sample to a second series of azimuthal slots which are closer to the center of the chuck, or the jaws would converge before the failure diameter could be measured for very flexible samples. Failure is designated as the value of the diameter ($D_f$) for which the transmission dropped to 50% of that recorded at 20 cm. for the same sample. Lower values of $D_f$ thus indicate samples which are more resistant to kinking. A value of $D_f$ which is equal to or less than the core mixture diameter (i.e., a bend radius equal to or less 2 times the core mixture diameter) is an acceptable value of resistance to kinking or other deformation. The very soft sheathings examined do not achieve this tight bending without deformation, as indicated by loss of light transmission.

An alternate test for studying resistance to kinking, but somewhat less discriminatory, is again to test the FLP without unhooking either the light source or the detector from the sample ends, and wrapping around a solid mandrel which distributes force evenly, thus minimizing kinking of the FLP under study. The intensity is monitored prior to wrapping the sample, and then while the sample is wrapped around a 11.2 cm. mandrel. Subsequently, the sample is wrapped around a 7.8 cm. mandrel and re-measured. The % of transmitted light (% $T_{7.8}$) at the smaller mandrel (relative to the larger) is recorded. The higher the value, the less distortion or kinking of the sample.

The ability of the core/clad/sheathing composite to form or drape or take the shape desired is measured by a drape width determination. Samples of the same composition as reported above in the mandrel test are cut to lengths of 6 ft. (180 cm.), then fastened to a straight steel pipe and annealed at 90° C. for 12 hours to remove any curvature from processing or storage. The samples are then cooled to the test temperature and maintained there for several hours, removed from the steel support, and are hung by centering on a horizontal 1.5 cm. diameter pipe or rod. The width of the resultant arc (inside edge to inside edge) is measured (DW value) at a distance of 5.5 cm. below the balance point (the top of the supporting horizontal pipe or rod). Samples are run in duplicate. A value of DW of 15 times or less the diameter of the horizontal drape rod indicates adequate flexibility for the uses required.

Light pipes and FLPs are often coupled to high-flux illuminators, such as the GE Light Engine™, for conveying bright light to a desired use point (end-lit applications) or illumination or decoration utilizing the length of the light pipe (side-lit, side-emission or "neo-neon" applications). Other useful sources include, but are not limited to, direct solar light, focused solar light, fluorescent lamps, high-, medium- and low-pressure sodium lamps, quartz-halogen, tungsten-halogen and incandescent lamps.

Many envisioned uses of flexible light pipe do not require the combination of flexibility and resistance to deformation taught herein. Applications in the following areas where a combination of flexibility of resistance to deformation is required include: certain automotive and transportation uses, such as in dashboard lights, accent lights, map readers, certain interior lighting of boats, trailers, campers and airplanes, and the like; certain retail lighting uses, such as in point of purchase displays, and the like; architectural lighting, traffic lights, mining lights, such as hard hat lighting; to remote source systems, such as in prison cells, hazardous environments, zoos, aquariums, art museums, and the like; residential lighting, as in novel lighting for showers; specific task lighting, such as auto mechanic lighting, surgeon/dentist lighting, "high tech" manufacturing lighting, endoscopes, photographic uses, and the like; and other specialty lighting. Other possible uses include: ionically conductive multilayer films with flexible cores for electrochromic displays, non-metal resistance heaters, touchpads and artificial muscles; chemiluminescent devices; and the like.

Other embodiments of the invention will be apparent to those skilled in the art from a consideration of this specification or practice of the invention disclosed herein. It is intended that the specification and examples be considered exemplary only, with the true scope and spirit of the invention indicated by the claims, following.

Experimental

A flexible light pipe was prepared essentially by the method of Example #28 of U.S. Pat. No. 5,485,541, with the exception that a static mixer was employed instead of the stirred mixer of the example and a line speed of 24 ft./min. (731.5 cm./min.) was utilized. The core diameter was 5.1 mm. and the cladding thickness 0.22 mm.

The thermoplastic elastomer was a commercial product known as Dynaflex G-2706, a product of GLS Plastics, and is believed to be a block copolymer of styrene and hydrogenated butadiene; the block length or composition is not known. The polyethylene, believed to be a homopolymer, but of unknown molecular weight, is black and available from Union Carbide as wire and cable compound #DFDD-6059 Black 9865. It is believed that the exact composition of the two components will have little effect on the performance of the jacketing blend, as long as their physical properties, such as modulus and elongation, are similar to the described components.

The clad light pipe was processed on machinery typical of a wire coating operation; the pipe was unwound from a reel and passed through a crosshead die where the sheathing compound was applied from the melt. The crosshead die was attached to a small (25.4 mm.) single screw extruder. The tip of the pressure type tooling to apply the coating had an inside diameter of 6.0 mm. The die had an inner diameter of 8.0 mm. with a 6 mm. land. The dimensions of the die tooling determine the thickness of the sheathing. In the present example, the sheathing or jacketing was 1 mm. thick.

After sheathing, the sheathed light pipe was quenched in a conventional horizontal cooling trough. The sheathed light pipe was produced at a line speed of 8–10 feet (2.4 to 3 meters)/minute, with a belt puller used to maintain line speed. The outside diameter of the product was measured with a dual axis laser gauge.

Extrusion conditions for the sheathing were: barrel zone 1=380° F. (193° C.); barrel zone 2=395° F. (202° C.); barrel zone 3=435° F. (224° C.); die 450° F. (232° C.); screw speed 35 rpm; die pressure 890–1050 psig (6132–7235 kPa).

TABLE I

Description of Results of Testing of 5 mm. Diameter Flexible Light Pipe with FEP Fluorocarbon Cladding and Thermoplastic Elastomer/ Polyethylene Blends as Sheathing: Use of the Variable Diameter Mandrel, of the 7.8 cm. Diameter Mandrel and of the Arc Width Drape Test

| Sample | % TPE | % LLDPE | Jacket thickness, mm. | $D_f$ (cm.) | % T on 7.8 mandrel | Drape Test Arc Width, cm. (DW) |
|---|---|---|---|---|---|---|
| 1 | 0 | 100 | 0.43 | 3 | 82 | 27.9 |
| 2 | 50 | 50 | 0.91 | 4 | 84 | 21.1 |
| 3 | 67 | 33 | 0.76 | 5 | 75 | 18.8 |
| 4 | 82 | 18 | 1.09 | 9 | 77 | 16.8 |
| 5 | 90 | 10 | 0.86 | 12, 14 | 74; 33 | 15.8; 16.8 |
| 6 | 100 | 0 | 1.24 | 17 | 36 | 15.1 |

I claim:

1. A flexible light pipe having a visible light transmission loss of less than 2 decibels/meter, comprising:

a) a crosslinked core polymer of diameter at least 3 mm;

b) a fluoropolymer cladding whose refractive index is lower than that of the core;

c) a sheathing for the core/cladding combination which sheathing comprises a thermoplastic elastomer and a polyolefin, and which sheathing, in combination with the core and cladding, will (a) withstand (as measured by the $D_f$ value) a 180 degree bend at 20° C. at a bend radius equal to or less than 2 times the core mixture diameter; and (b) exhibit a drape test arc width (as measured by the DW value) less than 15 times the diameter of the drape rod.

2. The flexible light pipe of claim 1 wherein the fluoropolymer cladding is vinylidene fluoride/tetrafluoroethylene/hexafluoropropylene terpolymer or a perfluoroalkyl vinyl ether/tetrafluoroethylene/hexafluoropropylene terpolymer.

3. The flexible light pipe of claim 2 wherein the vinylidene fluoride/tetrafluoroethylene/hexafluoropropylene terpolymer contains 50–55 weight percent vinylidene fluoride, 28–32 weight percent tetrafluoroethylene and 16–20 weight percent hexafluoropropylene.

4. The flexible light pipe of claim 3 wherein the thermoplastic elastomer is a styrene/hydrogenated butadiene block copolymer or a styrene/hydrogenated butadiene/styrene block copolymer.

5. The flexible light pipe of claim 4 wherein the polyolefin is linear low density polyethylene.

6. The flexible light pipe of claim 5 wherein the sheathing is a blend of a styrene/hydrogenated butadiene block copolymer and linear low density polyethylene in the weight ratio 1:1 to 6:1.

7. The flexible light pipe of claim 6 wherein the weight ratio is 1:1 to 4:1.

* * * * *